Aug. 12, 1969
W. A. PROELL
3,460,348
PROCESS FOR CATALYTICALLY CONTROLLED DECOMPOSITION
OF A SOLID GAS FORMING BODY
Filed April 7, 1967
2 Sheets-Sheet 2
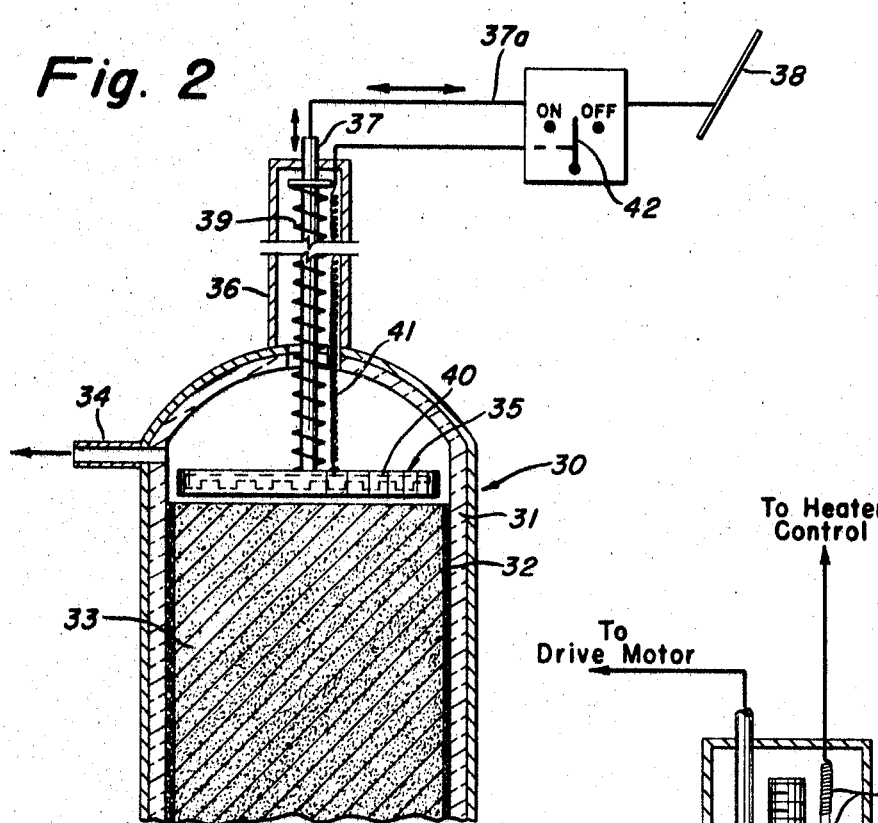
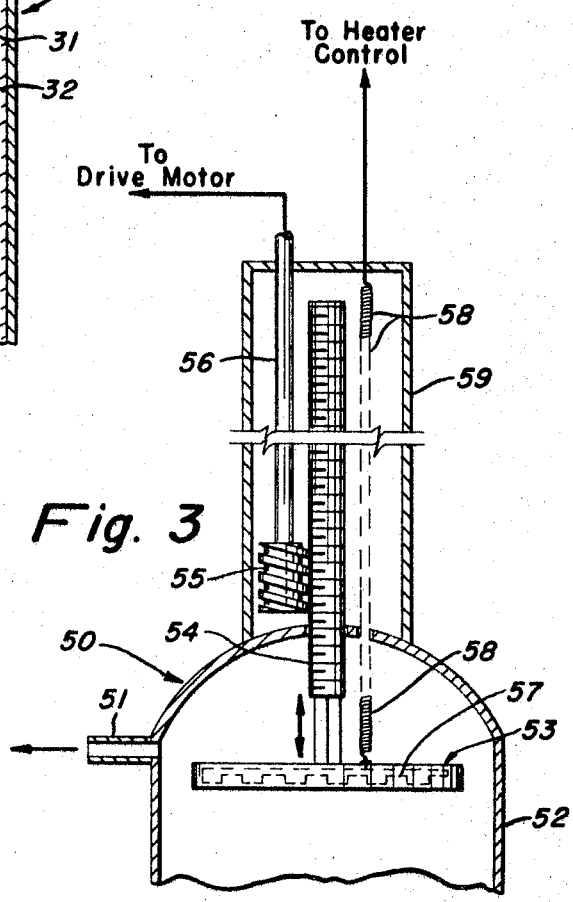
INVENTOR.
Wayne A. Proell
BY David B. Koss
ATTORNEY 3,460,348
PROCESS FOR CATALYTICALLY CONTROLLED DECOMPOSITION OF A SOLID GAS FORMING BODY
Wayne A. Proell, Seymour, Ind., assignor to Standard Oil Company, Chicago, Ill., a corporation of Indiana
Filed Apr. 7, 1967, Ser. No. 629,294
Int. Cl. F23v *1/00;* C06d *5/00;* C06b *13/00*
U.S. Cl. 60—218                                                6 Claims

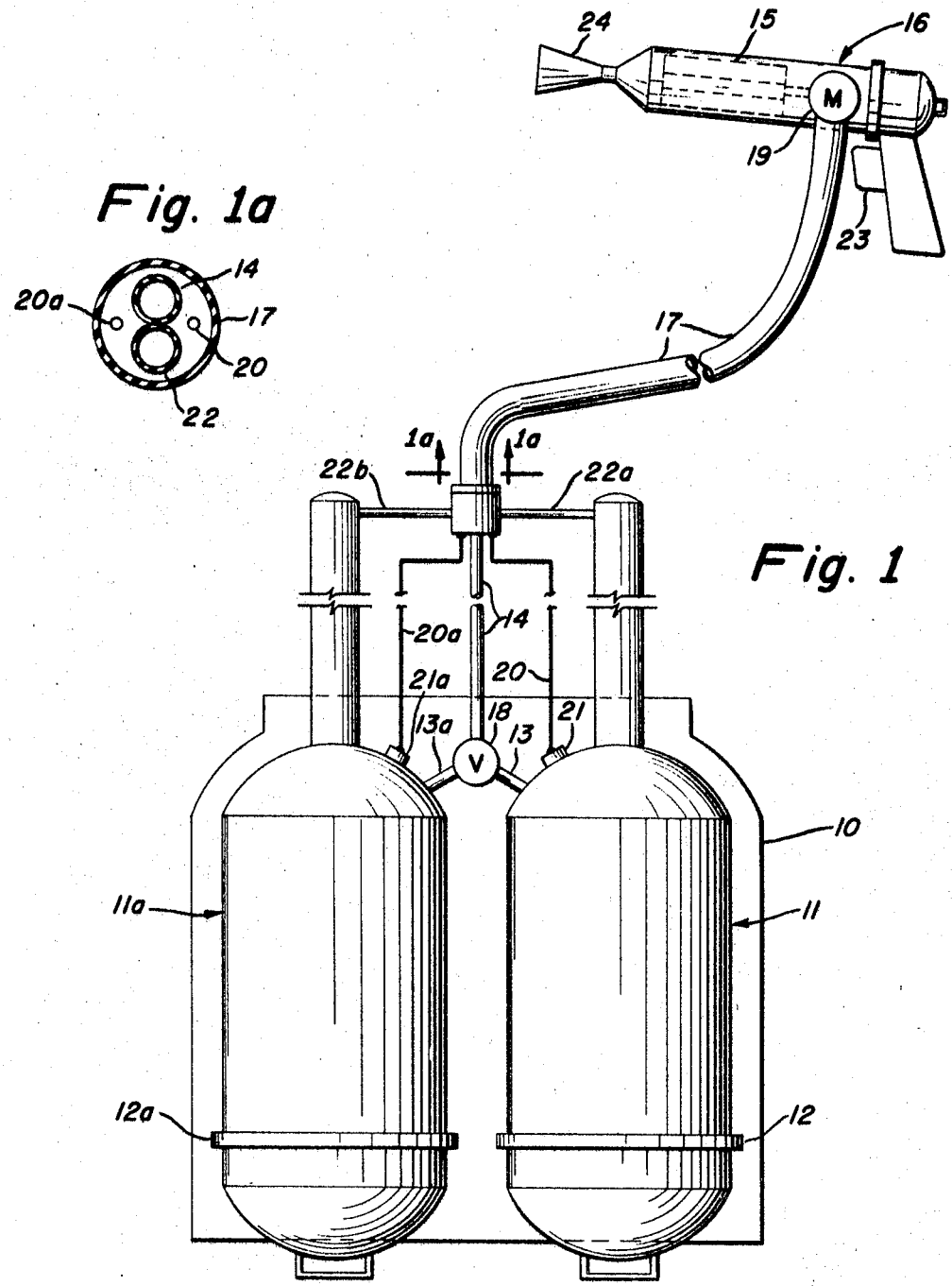

ABSTRACT OF THE DISCLOSURE

Apparatus and process for controlled decomposition of gas forming body by contacting the body, which is incapable of controlled, sustained decomposition, with movable catalyst effective to cause decomposition, and heating the catalyst.

---

This invention relates to controlled decomposition of a gas forming body, and more particularly, to restartable, controllable rocket systems using solid fuel.

Rocket systems using solid propellants are generally unsuitable for uses involving repeated starting after termination of combustion. Generally, once a solid propellant is ignited, combustion continues until the propellant grain is entirely consumed. In order to achieve a restarting ability, prior art devices have involved hybrid systems, with sensitive metering devices, or devices which allow the propellant to continue burning without additional thrust. This is usually accomplished by measuring the pressure within the gas generator and varying the nozzle area in order to achieve a zero thrust. Hybrid systems usually depend on involved metering means to provide sufficient hypergolic fuel to initiate and sustain combustion. Where light-weight, simplified apparatus is desired, both of these systems are found to be unsatisfactory. In addition, a solid propellant gas generator has the advantage of easy replacement of the cartridge after consumption of the previous grain.

We have now discovered a rocket system having none of the disadvantages mentioned above. Briefly, an uncatalyzed solid propellant which is capable of controlled, sustained decomposition only when catalyzed is contacted with a catalyst. The catalyst may be impregnated on a grid which is adapted to heated propellant. By controlled, sustained decomposition is meant decomposition in a manner which will produce gases at a desired rate. The desired rate includes the capability of termination of gas formation after initiation, and restarting. The rate of gas formation is, of course, related to thrust. It is possible to use a propellant having catalyst, but in an amount less than sufficient to form gas, in a controlled, sustained manner. By contacting the propellant with the grid and raising the temperature of the grid, decomposition is initiated. Heating may then be ceased and combustion will continue provided the catalyzed grid remains in contact with the propellant. In order to terminate combustion the grid is simply removed from the propellant.

It is desirable in many instances to provide a hand-held control unit with a thrust nozzle for vector control and control of rate of reaction. This control unit may also contain a secondary reactor in which the gases leaving the gas generator are reacted in order to produce high specific controllable thrust. The gas from the generator may be led through a tube to the thrust element which comprises a small reaction chamber provided with a thrust nozzle. The reaction chamber may contain a fuel hypergolic with the gases from the generator. As the gases are controllably injected into the thrust reactor, a high flame temperature may be attained, and the hot gas yields thrust as it leaves the nozzle.

The above system has the potential of varying the thrust from a few ounces for several hours to several hundred pounds for a short period of time. The advantages include the achievement of controllability, high reliability, quick reload capability in remote places, and the use of an all-solid, minimum-moving parts system. The low-thrust device may be used in space maneuvers to provide self-contained propulsion for personnel for any hours in space stations and general out-of-ship operations. The high-thrust embodiments can be used for moving heavy loads or in docking maneuvers. The device can be obtained with reload capabilities using solid cartridges storable in the vacuum of space. In addition, the device may be used in high gratitational fields as an aid to personnel, for example, in jumping over small bodies of water or other obstacles.

The present invention will be better understood by the following description of the preferred embodiments thereof, given in connection with the accompanying drawings, wherein:

FIGURE 1 is a simplified over-all view of one embodiment of the invention useful for transportation of personnel;

FIGURE 1a is an enlarged cross sectional view at 1a—1a of FIGURE 1;

FIGURE 2 is a view of an embodiment of the catalytic grid driving means, partly in cross section;

FIGURE 3 is a view of a motor driven catalytic grid, partly in cross section.

In the discussion of the invention which follows reference will be made to use of an uncatalyzed ammonium nitrate grain, but it should be understood that any solid grain which yields an oxidizing gas and which burns in a controlled, sustained manner only when catalyzed may be used. If no further reaction is required of the gases from the grain, then any solid gas forming grain may be utilized. A number of such solid gas forming bodies are known, for example, lithium, sodium, potassium perchlorates and nitrates, ammonium perchlorate, magnesium perchlorate, etc. Ammonium nitrate is particularly suitable since it is generally insensitive and cannot be detonated by the local application of heat. When ignited, ammonium nitrate does not sustain flame propagation consistently, it does not burn uniformly and has a tendency to go out particularly when used in the absence of combustible organic material. If mixed with oxidizable material such as sulfur, carbon, hydrocarbons, cellulosic materials, etc., the excess oxygen available in the ammonium nitrate is utilized. These mixtures are either insensitive, or even when provided with a catalyst may not burn at a rate sufficient for the service desired. A sustained thrust, upon decomposition to form gases, is referred to as controlled decomposition. This is obtained by smooth burning of the grain, rather than detonation. Ordinary ammonium nitrate explosives exhibit detonating characteristics.

It is understood that the grain may contain additives such as stabilizers, gas cleanliness agents, etc. It is also possible to use an oxidizable binder. The preferred embodiment of the invention comprises a gas generator, having an ammonium nitrate uncatalyzed or only partially catalyzed grain, which yields an oxidizing gas in a controllable manner, the temperature of the gas being about 400° C. and a thrust generator in which a major amount of this gas is reacted with a minor amount of fuel to generate high energy thrust producing gas. Any suitable combustion chamber may be used. The thrust generator contains a fuel hypergolic with the nitrogen gases from the ammonium nitrate generator. The above embodiment results in simplified means of control and is, therefore, much more suitable for the intended purpose than a conventional rocket engine. Unlike known hybrid engines this device does not use metering devices and is self-controllable. The control feature is entirely embodied in the gas generator section. By appropriate design of the thrust section and proper selection of the fuel therein, the gas injected into the thrust section will react completely so that mixture and mixture ratio problems are negligible. There is, therefore, no need for control of the thrust generation process as part of the thrust chamber. The problem is hybrid rockets, of initiating combustion in the thrust generation chamber, is a serious one. Likewise, the problems of raising the injected oxidant to reaction temperature makes design critical and the actual initiation of combustion creates reliability problems. In our invention the injected gas put in the thrust reactor is hot, gaseous and reactive, which minimizes the usual combustion problems and permits a wide selection of fuel charges for the thrust chamber. The control of the unit rests entirely upon the gas generator.

Combustion may be accomplished by contacting the propellant surface with a metal grid supporting a catalyst. For ammonium nitrate, many catalysts are known such as chromates, iron oxides, dichromates and the iron cyanide types. Inorganic combustion catalysts include ammonium dichromate, Prussian blue, potassium dichromate, and the like. Certain promoters are also useful in this invention, examples of which may be found in U.S. 2,936,225. Initiation of the reaction requires that at least a portion of the grid have a temperature which will cause combustion which for ammonium nitrate, is about 300° C. This may be conveniently accomplished by an electrical current of 25-50 watts. Once the reaction is initiated, all the ammonium nitrate in contact with the grid burns rapidly to a gas. The following equation is representative of the reaction for ammonium nitrate:

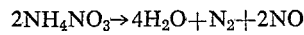

$$2NH_4NO_3 \rightarrow 4H_2O + N_2 + 2NO$$

The grid acquires a temperature of about 400° C. as soon as the reaction is initiated, and the electrical current may then be turned off. Combustion continues as long as the catalyst impregnated grid is in contact with the ammonium nitrate. If the grid is removed from the surface of the nitrate by even a few millimeters combustion stops. The catalyst grid may be a Nichrome grid with a fused-on potassium dichromate catalyst. Control of the system is primarily achieved by terminating the reaction as desired and restarting it by electrically heating the grid and placing it in contact with the grain. Modulation of the rate of the reaction, however, may also be accomplished by controlling the pressure level in the gas generator through a throttling device or by providing a means for varying the rate of feeding nitrate to the reaction screen, i.e., as decomposition occurs in the grid-grain interface, the rate of gas generation can be controlled by varying the rate at which the grid is fed onto the grain.

In another embodiment the control of the reaction may be accomplished by driving the grid forward, as for example by manual means, or electrically or by a hydraulic cylinder. In the latter method, by controlling the rate of fluid input to the cylinder the rate of advance of the grid can be manipulated. The pressure chamber acts on a smaller area than provided by the cylinder piston so that back pressure introduces at most a negligible error. A control fluid flow rate is achieved by maintaining the fluid at a constant pressure, for example, by pressurizing a reservoir with nitrogen. A suitable control fluid is water. The fluid flow rate and the rate of advancing grid is determined by a metering valve placed in the line connecting the water reservoir and the grid drive cylinder. The valve may be equipped with a reservoir and grid drive cylinder. The valve may be equipped with a reservoir handle which is capable of exacting reproducibility. A solenoid may be placed in the line to enable on/off operation.

Start-up of the gas generator may be achieved by employing a gun powder-propellant layer pressed on the surface of the grain. This layer may be initiated with a squib and serves to heat the grain to operating temperature and pressurizes the motor chamber. Decomposition of the grain is possible at pressures in excess of 1000 p.s.i. and burn-rate variations in excess of 10:1 are attainable.

The thrust generating chamber is suitably a light-weight insulated reactor containing a suitable cartridge of reducing agent. The materials particularly useful for rugged and low cost field service include organic plastics such as polyethylene and polymethyl methacrylate, and the like. For applications in which high impulse is required, a fuel cartridge can be alternately used, based on the light material hydrides such as lithium boron hydride, and lithium aluminum hydride.

In order to make a system useful to the military, certain supporting elements must be provided in addition to the basic generator and thrust nozzle. For personnel use where thrust vector is critical, the ability to point the nozzle is important. A particular embodiment comprises the generation of nitrous gases in a large case contained in a knapsack or strap-on pack. Since the primary gas is relatively cool, the gas should be led from the gas generator to the much smaller reactor chamber by means of a flexible tube insulated to conserve heat, and to permit the thrust generating nozzle to be held in the hand or located on the back pack with a vectoring level control. On/off capability may be accomplished remotely by two controls; an electrical switch to heat the igniting grid for a "ready" condition; and a lever control allowing a spring to push the grid against the nitrate charge, or one integrated control may be used. In use, man snaps on the ready switch, and modulates the thrust by moving the grid against the nitrate charge or away from it. A servo-control is also provided to automatically turn off the electrical ignition circuit when the grid reaches the appropriate temperature so that electricity is conserved during operation. A simple thermo-couple may also be utilized. A small battery is particularly suitable for the electrical load.

Unlike most liquid rocket systems, this does not involve the use of pumps or metering devices and, hence, it is basically safe, consistent, and reliable. Unlike most solid rocket systems, the present system generates gas only when the propellant is in contact with the catalytic surface, even after ignition. As a result, no propellant restrictors are required, and damaged or broken propellant grains will function just as well as the perfect ones. For this reason the charges for the unit will be very low in cost as compared to conventional solid propellants. Because of the minimal nature of required grain quality, the unit can be reloaded in the field many times by unskilled personnel. The device will be insensitive to altitude and need not require expensive squib or other igniter devices. The thrust chamber can similarly be made easily reloadable.

Referring to the drawings, in FIGURE 1, strap-on pack 10, is shown holding gas generators 11 and 11a. Both gas generators are shown with the capability of breech loading by means of couplings 12 and 12a. Upon decomposition of the fuel, the gases leave the gas generator by means of gas outlets 13 and 13a, and are conveyed through insulated tube 14 to thrust generator 15 containing high energy fuel, and contained in hand-held control unit 16. Tube 14 is partially contained within insulated tube 17. A valve 18 is placed on tube 14 in order to cut off the gas supply from either of the gas generators. Control unit 16 contains drive means 19 (shown as a motor) to drive the catalytic grid, (not shown); and, electrical power supply (not shown) to heat the grid. The electrical power supply conveys the electrical energy necessary to the grid by means of wires 20 and 20a. Sensing devices 21 and 21a are placed in the gas generator to automatically turn the heat off when the operating temperature is reached. The driving means 19 conveys power to the grid through tubes 22a and 22b. Control unit 16 is operated automatically so that upon pressing trigger 23 drive means 19 will be actuated and the grid heated, thereby causing the generation of gases which flow through tube 14 into thrust generator 15 where further reaction with the high energy fuel develops high energy thrust causing gases to exit through nozzle 24.

Referring to FIGURE 1a, insulated tube 17 contains gas outlet tube 14, heater wires 20 and 20a and tube 22 for conveying power from drive means 19 to catalytic grid.

Referring to FIGURE 2, gas generator 30 is shown in partial view with insulation 31, a foam grain protector 32 holding grain 33. Gas outlet means 34 is provided on the gas generator 30. Catalytic grid 35 moves through housing 36, broken lines, up or down, by means of shaft 37, which is manually operated by lever control 38 through connecting rod 37a. Retaining spring 39 holds grid 35 in up or disengaged position. Lever 38 is operated so as to move grid 35 into contact with grain 33. Heating element 40 is controlled through heater coil 41 by means of on/off switch 42, so as to heat a point on catalytic grid 35 to a temperature sufficient to initiate decomposition of grain 33.

Referring to FIGURE 3, gas generator 50 is shown in partial view with gas outlet means 51 and wall 52 and catalytic grid 53. Notched rack 54 is operably connected with gear 55. Gear 55 is connected with drive motor, not shown, by means of connecting rod 56. The drive motor is reversible so as to enable gear 55, upon rotation, to mesh with rack 54 in order to drive catalytic grid 53 up or down. Heating element 57 is connected to catalytic grid 53 and to heater coil 58, and extends to heater control, not shown. Housing 59, broken lines, retains coil 58, gear 55 and rack 54.

What is claimed is:

1. A process for decomposition of a gas forming body which is capable of controlled, sustained decomposition only when catalyzed and for the formation of a decomposition product, said process comprising:
    (a) contacting a gas forming solid propellant, comprising an oxidizer selected from the group consisting of lithium perchlorate, sodium perchlorate, potassium perchlorate, ammonium perchlorate, magnesium perchlorate, lithium nitrate, sodium nitrate, potassium nitrate, ammonium nitrate, and combinations thereof, said propellant being incapable of gas formation in a controlled, sustained manner, with a catalyst to form an interface between said propellant and said catalyst, said catalyst being adapted to catalyze said decomposition in a controlled, sustained manner;
    (b) heating at least a portion of said interface to a temperature sufficient to form a decomposition product; and
    (c) controlling the contact of said catalyst with said propellant, thereby controlling the rate of formation of said decomposition product.

2. The process of claim 1 wherein said decomposition product is removed from said interface and reacted with a fuel hypergolic with said decomposition product which is at a temperature sufficient to react hypergolically with said fuel, said temperature being imparted to said decomposition product as a result of said decomposition of said gas forming body, to form a reaction product.

3. The process of claim 1 wherein said propellant comprises ammonium nitrate.

4. The process of claim 2 wherein the temperature of said decomposition product is at least 300° C. and said propellant comprises ammonium nitrate, and said hypergolic fuel comprises polyethylene.

5. The process of claim 1 wherein said catalyst is potassium dichromate.

6. The process of claim 1 wherein said catalyst is potassium dichromate impregnated into the Nichrome grid.

References Cited

UNITED STATES PATENTS

| | | | |
|---|---|---|---|
| 3,065,596 | 11/1962 | Schultz | 60—220 X |
| 3,065,597 | 11/1962 | Adamson et al. | 60—220 |
| 3,065,598 | 11/1962 | Schultz | 60—220 X |
| 3,068,641 | 12/1962 | Fox | 60—220 X |
| 3,133,410 | 5/1964 | Gessner | 60—219 |

BENJAMIN R. PADGETT, Primary Examiner

U.S. Cl. X.R.

60—219, 220, 251